United States Patent
Kobayashi et al.

(10) Patent No.: US 6,678,690 B2
(45) Date of Patent: Jan. 13, 2004

(54) RETRIEVING AND RANKING OF DOCUMENTS FROM DATABASE DESCRIPTION

(75) Inventors: Mei Kobayashi, Aoba-ku (JP); Loic Malassis, Santo Domingo (DO); Hikaru Samukawa, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 09/879,756

(22) Filed: Jun. 12, 2001

(65) Prior Publication Data

US 2002/0032682 A1 Mar. 14, 2002

(30) Foreign Application Priority Data

Jun. 12, 2000 (JP) .................................. 2000-175848

(51) Int. Cl.[7] .......................... G06F 17/30; G06F 15/00
(52) U.S. Cl. ........................ 707/101; 707/3; 715/500
(58) Field of Search ............................. 707/1–10, 100, 707/101; 715/500

(56) References Cited

U.S. PATENT DOCUMENTS

| | | | | |
|---|---|---|---|---|
| 4,839,853 A | | 6/1989 | Deerwester et al. ........ 364/900 |
| 5,583,951 A | * | 12/1996 | Sirat et al. .................. 382/232 |
| 5,794,178 A | * | 8/1998 | Caid et al. ...................... 704/9 |
| 5,805,742 A | * | 9/1998 | Whitsitt ....................... 382/275 |
| 5,842,194 A | * | 11/1998 | Arbuckle ...................... 706/52 |
| 6,233,495 B1 | * | 5/2001 | Chen ......................... 700/122 |
| 6,345,109 B1 | * | 2/2002 | Souma et al. ............... 382/118 |

OTHER PUBLICATIONS

"Modern Information Retrieval", Baeza–Yates et al, 1999.
"Foundations of Statistical Natural Language Processing", Manning et al., MIT Press, 1999.
"The Smart Retrieval System–Experiments In Automatic Document Processing", Salton et al., 1971.
"Indexing by Latent Semantic Analysis", Journal of the American Society For Information Science, vol. 41, No. 6, 1990, pp. 391–407.

* cited by examiner

Primary Examiner—Safet Metjahic
Assistant Examiner—Marc Filipczyk
(74) Attorney, Agent, or Firm—Louis J. Percello; David Aker

(57) ABSTRACT

A method, a computer system, and a program product for retrieving and/or ranking documents in a database. The method comprising steps of, providing a document matrix derived from the documents, the matrix including numerical elements derived from the attributes; providing a covariance matrix derived from the document matrix; executing singular value decomposition of the covariance matrix so as to obtain the following formula: $K = V \cdot \Sigma \cdot V^T$, wherein K represents the covariance matrix, V represents the matrix consisting of eigenvectors, $\Sigma$ represents a diagonal matrix, and $V^T$ represents a transpose of the matrix V; reducing a dimension of the matrix V using a predetermined number of eigenvectors included in the matrix V, the eigenvectors including an eigenvector corresponding to the largest singular value; reducing a dimension of the document matrix using the dimension reduced matrix V; and retrieving and/or ranking the documents in the database by computing the scalar product between the dimension reduced document matrix and a query vector.

15 Claims, 10 Drawing Sheets

FIG. 1  Diagonalization of the Matrix

CREATION OF DOCUMENT MATRIX

```
<REUTERS>
  <DATA> </DATA>
  <TOPIC> </TOPIC>
  <PLACE> </PLACE>
  <PEOPLE> </ORG>
  <COMPANY> </COMPANY>
  <TEXT> </TEXT>
    <TEXT> title </TITLE>
    <DATELINE> 1st january </DATELINE>
    <BODY> ....... </BODY>
  </TEXT>
</RETURN>
```

RETRIEVING AND RANKING OF DOCUMENTS FROM DATABASE DESCRIPTION

FIELD OF THE INVENTION

The present invention relates to retrieving and/or ranking of documents in a large database, and more particularly relates to a method, a computer system, and a program product for retrieving and ranking the documents in a very large database by dimension reduction of a document matrix using a covariance matrix.

BACKGROUND ART

Recently as database systems handle increasingly large amounts of data, such as, for example, news data, client information, stock data, etc, it becomes increasingly difficult for users of such databases to search for desired information quickly and effectively, with sufficient accuracy. Timely, accurate, and inexpensive detection of new topics and/or events from large databases may provide very valuable information for many types of businesses including, for example, stock control, futures and options trading, news agencies which may desire to quickly dispatch a reporter without needing to maintain a number of reporters posted worldwide, and businesses based on the internet or other fast paced actions which need to know of major and new information about competitors in order to succeed.

Conventionally, detection and tracking of new events in an enormous database is expensive, elaborate, and time consuming work, because generally a searcher of the database needs to hire extra persons for monitoring tasks.

Recent detection and tracking methods used for search engines usually use a vector model for data in the database in order to cluster the data. These conventional methods generally construct a vector q (kwd1, kwd2, . . . , kwdN) corresponding to the data in the database. The vector q is defined as the vector having the dimension equal to numbers of attributes, such as kwd1, kwd2, . . . kwdN which are attributed to the data. The most commonly used attributes are keywords, i.e., single keywords, phrases, names of person(s), place(s). Usually, a binary model is used to create the vector q mathematically in which the kwd1 is replaced by 0 when the data do not include the kwd1, and the kwd1 is replaced by 1 when the data include the kwd1. Sometimes, a weight factor is combined with the binary model to improve the accuracy of the search. Such weight factor includes, for example, the number of times the keywords occur in the data.

FIG. 1(a) and FIG. 1(b) show typical methods for diagonalization of a document matrix D which is comprised of the above described vectors where the matrix D is assumed to be an n-by-n symmetric definite positive matrix. As shown, the n-by-n matrix D may be diagonalized by two representative methods depending on the size of the matrix D. When n is relatively small in the n-by-n matrix D represented at 20, the method used may typically be Householder bidiagonalization and the matrix D is transformed to the bidaiagonalized form as shown at 22 in FIG. 1(a) followed by zero chasing of the bidiagonalized elements at 24 to construct the matrix Vr consisting of the eigenvectors of the matrix D at 26.

In FIG. 1(b) another method for the diagonalization is described, and the diagonalization method shown in FIG. 1(b) as represented at 30 may be effective when the number n of the n-by-n matrix D is large or medium. The diagonalization process first executes Lanczos tridiagonalization as shown in FIG. 1(b) at 32 followed by Sturm Sequencing at 34 to determine the eigenvalues wherein "r" denotes the rank of the reduced document matrix. The process next executes Inverse Iteration at 36 so as to determine the i-th eigenvectors associated to the eigenvalues previously found as shown in FIG. 1(b) as shown at 38.

In so far as the size of the database is still acceptable for application of precise and elaborate methods to complete computation of the eigenvectors of the document matrix D, the conventional methods are quite effective to retrieve and to rank the documents in the database. However, in a very large database, the computation time for retrieving and ranking of the documents is sometimes too long for a user of a search engine. There are also limitations for the resources of computer systems, such as CPU performance and memory capacities needed for completing the computation.

Therefore, there are needs for a system implemented with a novel method for stably retrieving and ranking the documents in very large databases in an inexpensive, automatic manner within acceptable computation time.

DISCLOSURE OF THE PRIOR ART

Some statistical approaches have been proposed using algorithms for information retrieval based on vector space models (see, for example, Baeza-Yates, R., Riberio-Neto, B., "Modern Information Retrieval", Addition-Wesley, NY, 1999, and Manning, C. Schutze, H., "Foundations of Statistical Natural Language Processing", MIT Press, Cambridge, Mass., 1999).

Salton, G. et al., "The SMART Retrieval System—Experiments in Automatic Document Processing", Prentice-Hall, Englewood Cliffs, N.J., 1971, have reviewed the vector space model. They modeled the documents using vectors in which each coordinate of the vectors represents an attribute of the vectors, e.g., a keyword. In binary models of the vector, a coordinate takes on the value unity when the corresponding attribute is present in the documents and zero when the attribute is absent from the document. More sophisticated document vector models take into account weighting of the keyword such as frequency and location of appearance, e.g., in the title, section header, or abstract.

Queries are also modeled as vectors in the same manner as described for the documents. For a given user input query, the relevancy of a particular document is computed by determining the "distance" between the query and each of the document vectors. Although a number of different kinds of norms may be used to determine the "distance" between the query vector and the document vector, the angle between the query and the document vector derived from a scalar product is used as the most common procedure to determine the distance therebetween.

U.S. Pat. No. 4,839,853 issued to Deerwester et al., entitled "Computer information retrieval using latent semantic structure", and Deerwester et. al., "Indexing by latent semantic analysis", Journal of the American Society for Information Science, Vol. 41, No. 6, 1990, pp. 391–407 disclose a unique method for retrieving the document from the database. The disclosed procedure is roughly reviewed as follows;

Step 1: Vector space modeling of documents and their attributes.

In latent semantic indexing, or LSI, the documents are modeled by vectors in the same way as in Salton's vector space model. In the LSI method, the relationship between the query and the documents in the database are represented by an m-by-n matrix MN, the entries are represented by mn (i, j), i.e., $$MN=[mn(i,j)].$$

In other words, the rows of the matrix MN are vectors which represent each document in the database.

Step 2: Reducing the Dimension of the Ranking Problem via Singular Value Decomposition.

The next step of the LSI method executes singular value decomposition, or SVD of the matrix MN. Noises in the matrix MN are reduced by constructing a modified matrix $A_k$ from the k-th largest singular values $f_i$, wherein i=1, 2, 3, ..., k, ... and their corresponding eigenvectors are derived from the following relation;

$$MN_k = U_k \Sigma_k V_k^T,$$

wherein $\Sigma$ is a diagonal matrix with monotonically decreasing diagonal elements of $f_i$. The matrices $U_k$ and $V_k$ are the matrices whose columns are left and right singular vectors of the k-th largest singular values of the matrix MN.

Step 3: Query Processing.

Processing of the query in LSI-based Information Retrieval comprises two further steps: (1) query projection followed by (2) matching. In the query projection step, input queries are mapped to pseudo-documents in the reduced query-document space by the matrix $U_k$, and then are weighted by the corresponding singular values $f_i$ from the reduced rank and singular matrix $\Sigma$. This process may be described mathematically as follows;

$$q^{-hat}\{q\} = q^T U_k \Sigma_k^{\{-1\}}$$

wherein q represent the original query vector, $^{hat}\{q\}$ represents a pseudo-document vector, $q^T$ represents the transpose of q, and {−1} represents the inverse operator. In the second step, similarities between the pseudo-document $^{hat}\{q\}$ and the documents in the reduced term document space $V_k^T$ are computed using any one of many similar measures.

Although there are many conventional methods for retrieving and ranking the document as described above, the inventors of the present invention have long sought a novel method for retrieving and ranking the documents in very large databases effectively and quickly, with sufficient accuracy.

SUMMARY OF THE INVENTION

The present invention was essentially made by finding that the eigenvectors of the covariance matrix K having the largest eigenvalue represents the most predominant feature, and the eigenvector of the covariance matrix having the second largest eigenvalue represents the second most significant feature, and so on. Therefore, it is effective to use a certain small set of the eigenvectors of the covariance matrix for dimension reduction of the document matrix D.

In the present invention, to meet a user input query, the dimension of the document matrix D is reduced as follows:

(1) compute the j-th largest eigenvalues of the covariance matrix K and their corresponding eigenvectors v (Dj) first $$\lfloor d(j); j=1,2,3, \ldots,$$

(2) compute the k-th dimensional subspace for documents d(i), which spanned by the k eigenvectors corresponding to the j-th largest eigenvalues of D as follows;

$$d(i) = \underset{(i,j)}{\text{sum}}\, c(i, j)\, v(Dj),$$

where i and j denote the respective indexes for documents and eigenvectors, and c denotes corresponding coefficients,
(3) project the user input query vector onto the k-th dimensional subspace defined by the eigenvectors which correspond to the j-th largest eigenvalues, and
(4) rank the relevancy of each document with respect to the user-input query by computing the distance therebetween.

Therefore, according to a first aspect of the present invention, a method for retrieving and/or ranking documents in a database, documents being added to said database, and including attribute data may be provided. The method comprises steps of;

providing a document matrix derived from said documents, said matrix including numerical elements derived from said attribute data;

providing a covariance matrix derived from said document matrix;

executing singular value decomposition of said covariance matrix so as to obtain the following formula;

$$K = V \cdot \Sigma \cdot V^T,$$

wherein K represents said covariance matrix, V represents the matrix consisting of eigenvectors, $\Sigma$ represents a diagonal matrix, and $V^T$ represents a transpose of the matrix V;

K represents said covariance matrix, V represents the matrix consisting of eigenvectors, © represents a diagonal matrix, and $V^T$ represents a transpose of the matrix V;

reducing a dimension of said matrix V using predetermined numbers of eigenvectors included in said matrix V, said eigenvectors including an eigenvector corresponding to the largest singular value;

reducing a dimension of said document matrix using said dimension reduced matrix V; and retrieving and/or ranking said documents in said database by computing the scalar product of said dimension reduced document matrix and a query vector.

According to the first aspect of the present invention, said attributes include at least one keyword and a time stamp.

According to the first aspect of the present invention, said covariance matrix may be computed by the following formula;

$$K = B - X_{bar} \cdot X_{bar}^T$$

wherein K represents the covariance matrix, B represents a momentum matrix, $X_{bar}$ represents a mean vector and $X_{bar}^T$ represents a transpose thereof.

According to the first aspect of the present invention, said predetermined numbers may be 15–25% of the total of the eigenvectors of said covariance matrix.

According to the first aspect of the present invention, the method further includes a switching step, from dimension reduction using said document matrix directly to dimension reduction using said covariance matrix, depending on predetermined computation time such that said dimension reduction using said covariance matrix is executed when said dimension reduction of said document matrix using eigenvectors thereof computed from said document matrix is not completed within said predetermined computation time.

According to a second aspect of the present invention, a computer system for executing a method for retrieving and/or ranking documents in a database, documents being added to said database, and including attribute data, may be provided. The computer system executes the method comprising steps of;

providing a document matrix from said documents, said matrix including numerical elements derived from said attribute data;

providing a covariance matrix derived from said document matrix;

executing singular value decomposition of said covariance matrix so as to obtain the following formula;

$$K = V \cdot \Sigma \cdot V^T,$$

wherein K represents said covariance matrix, V represents the matrix consisting of eigenvectors, $\Sigma$ represents a diagonal matrix, and $V^T$ represents a transpose of the matrix V;

reducing a dimension of said matrix V using predetermined numbers of eigenvectors included in said matrix V, said eigenvectors including an eigenvector corresponding to the largest singular value;

reducing a dimension of said document matrix using said dimension reduced matrix V; and retrieving and/or ranking said documents in said database by computing the scalar product of said dimension reduced document matrix and a query vector.

According to the second aspect of the present invention, said attributes include at least one keyword and a time stamp.

According to the second aspect of the present invention, said covariance matrix may be computed by the following formula;

$$K = B - X_{bar} \cdot X_{bar}^T$$

wherein K represents a covariance matrix, B represents a momentum matrix, $X_{bar}$ represents a mean vector and $X_{bar}^T$ represents a transpose thereof According to the second aspect of the present invention, said predetermined numbers are 15–25% of the total of the eigenvectors of said covariance matrix.

According to the second aspect of the present invention, said method further may include a switching step, from dimension reduction using said document matrix directly to dimension reduction using said covariance matrix, depending on predetermined computation time so that said dimension reduction using said covariance matrix is executed when said dimension reduction of said document matrix using eigenvectors thereof computed from said document matrix is not completed within said predetermined computation time.

According to a third aspect of the present invention, a program product including a computer readable computer program for executing a method for retrieving and/or ranking documents in a database, documents being added to said database, and including attribute data, may be provided. The method comprises steps of:

providing a document matrix derived from said documents, said matrix including numerical elements derived from said attribute data;

providing a covariance matrix from said document matrix;

executing singular value decomposition of said covariance matrix so as to obtain the following formula;

$$K = V \cdot \Sigma \cdot V^T$$

wherein K represents said covariance matrix, V represents the matrix consisting of eigenvectors, $\Sigma$ represents a diagonal matrix, and $V^T$ represents a transpose off the matrix V;

reducing a dimension of said matrix V using predetermined numbers of eigenvectors included in said matrix V said eigenvectors including an eigenvector corresponding to the largest singular value;

reducing a dimension of said document matrix using said dimension reduced matrix V; and retrieving and/or ranking said documents in said database by computing the scalar product of said dimension reduced document matrix and a query vector.

According to the third aspect of the present invention, said covariance matrix may be computed by the following formula;

$$K = B - X_{bar} \cdot X_{bar}^T$$

wherein K represents the covariance matrix, B represents a momentum matrix, $X_{bar}$ represents a mean vector and $X_{bar}^T$ represents a transpose thereof According to the third aspect of the present invention, said predetermined numbers may be 15–25% of the total of the eigenvectors of said covariance matrix.

According to the third aspect of the present invention, said method may further include a switching step, from dimension reduction using said document matrix directly to dimension reduction using said covariance matrix, depending on predetermined computation time so that said dimension reduction using said covariance matrix is executed when said dimension reduction of said document matrix using eigenvectors thereof computed from said document matrix is not completed within said predetermined computation time.

BRIEF DESCRIPTION OF THE DRAWINGS

The present invention will be further understood by explaining the following non-limiting embodiments of the present invention along with drawings thereof wherein the drawings are described as follows.

BEST MODE FOR CARRYING OUT THE INVENTION

1. General Procedure for Retrieving and Ranking of Documents

Figure 1:
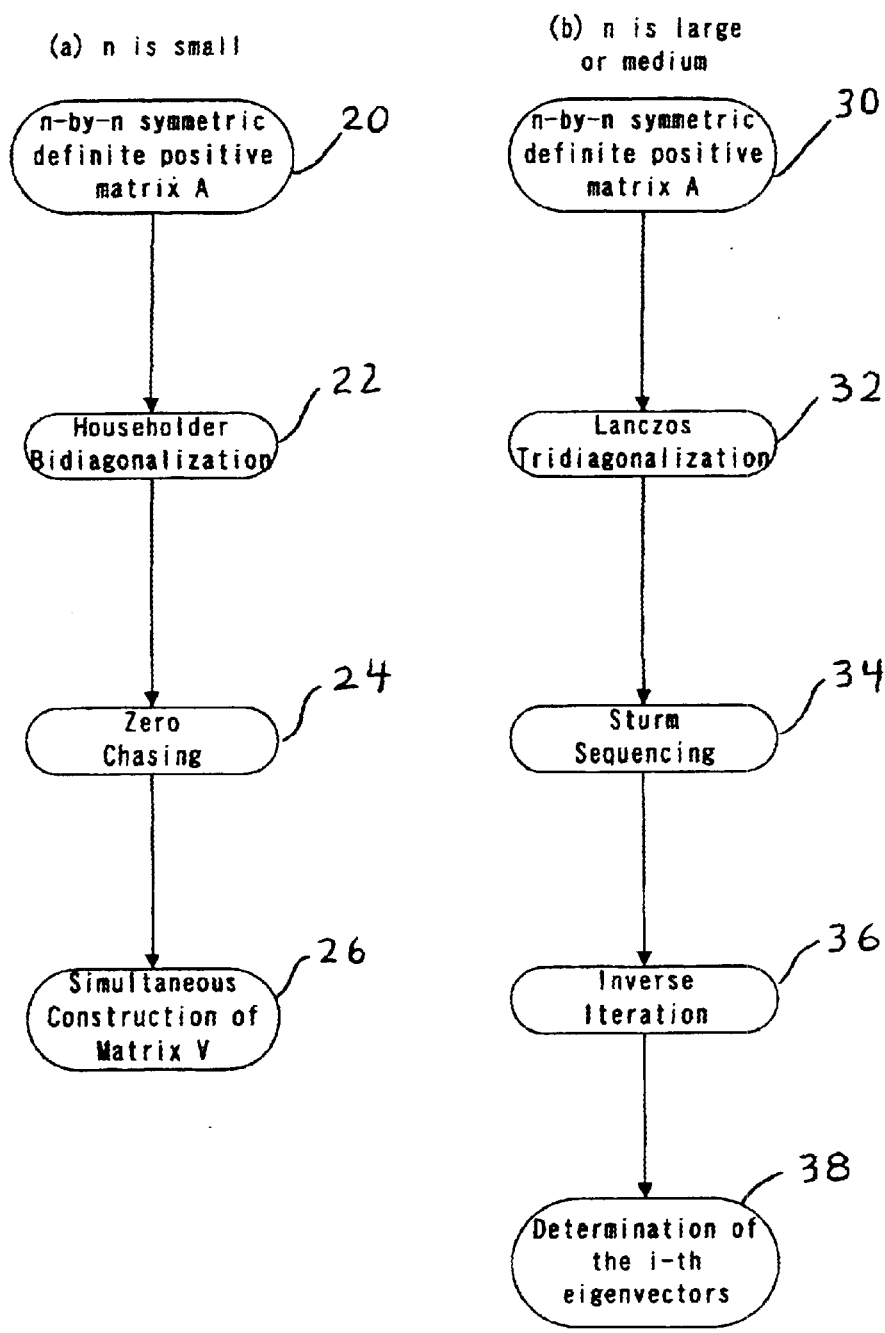
FIG. 1(a) and FIG. 1(b) illustrate representative methods conventionally used to diagonalize matrixes.
Figure 2:
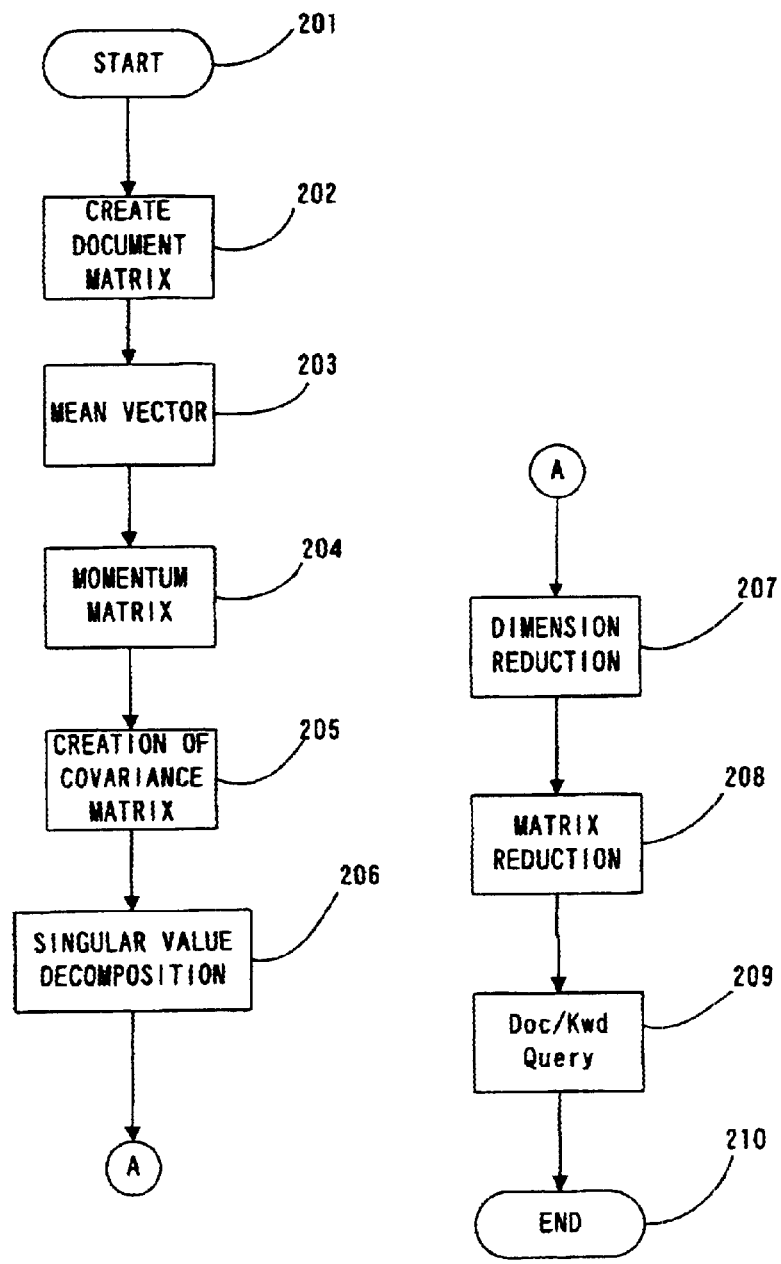
FIG. 2 is a flowchart of a method according to the present invention.

FIG. 2 is a flowchart of the method according to the present invention. The method starts at step 201, and proceeds to step 202 and creates the document matrix D (m-by-n matrix) from the keywords included in the documents. It may be possible to use time stamps simultaneously for creating the document matrix D such as time, date, month, year, and any combination thereof.

The method then proceeds to step 203 and calculates mean vectors $X_{bar}$ of the document vectors. The method proceeds to step 204 and computes the momentum matrix $B-D^T \cdot D/n$, wherein B denotes the momentum matrix, and $D^T$ denotes the transpose of the document matrix D. The method proceeds to step 205 and then computes the covariance matrix K according to the following formula:

$$K = B - X_{bar} \cdot X_{bar}^T,$$

wherein $X_{bar}^T$ denotes the transpose of the mean vector $X_{bar}$.

The method according to the present invention thereafter proceeds to step 206 and executes singular value decomposition of the covariance matrix K as follows;

$$K = V \cdot \Sigma \cdot V^T,$$

where the rank of the covariance matrix K, i.e., rank (K), is r.

The method then proceeds to step 207 and executes dimension reduction of the matrix V such that a predetermined numbers k of the eigenvectors corresponding to the eigenvectors having the largest top 15–25% singular value may be included so as to create the dimension reduced matrix $V_k$. The method thereafter proceeds to step 208 and executes reduction of the document matrix using the dimension reduced $V_k$ in order to provide the dimension reduced document matrix, i.e., the document subspace used to conduct retrieving and ranking of the document with respect to the query vector such as the Doc/Kwd query search, New Event Detection and Tracking as described in step 209. Hereafter, the essential steps of the present invention will be discussed in detail.

2. Creation of Document Matrix

Figure 3:
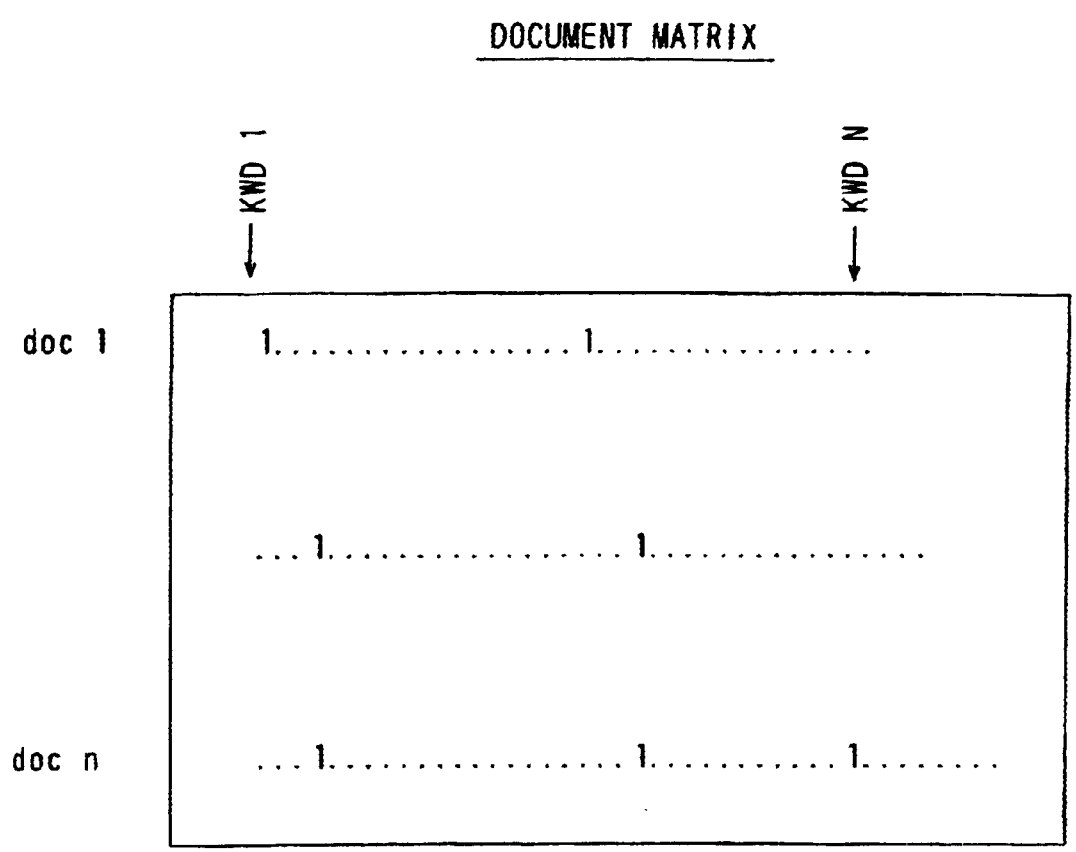
FIG. 3 is a schematic construction of a document matrix.

FIG. 3 shows an example of the document matrix D. The matrix D comprises rows from document 1 (doc 1) to document n (doc n) which include elements derived from the keywords (kwd 1, . . . , kwd n) included in the particular document. The numbers of documents and the number of keywords are not limited in the present invention, and depend on the documents and size of the database. In FIG. 3, the elements of the document matrix D are represented by the numerals 1. However, other positive real numbers may be used as when weighting factors are used to create the document matrix D.

Figure 4A:
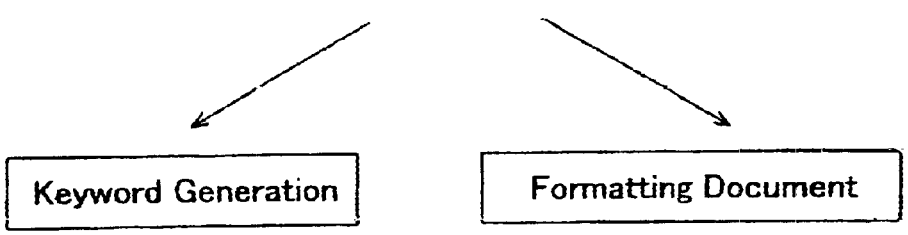
FIG. 4(a) and FIG. 4(b) illustrate schematic procedures for forming the document matrix, and for formatting thereof, respectively.
Figure 4B:
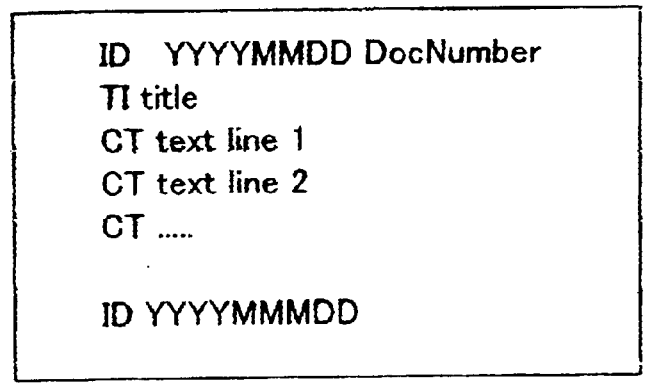

In FIG. 4(a) and FIG. 4(b), an actual procedure for forming the document matrix is shown. In FIG. 4(a), a document written under SGML format is assumed. The method of the present invention generates keywords based on the document with which retrieval and ranking are executed and then converts the format of the document into another format, such as, for example, shown in FIG. 4 (b), suitable for use in the method according to the present invention. Formats of the documents are not limited to SGML, and other formats may be used in the present invention.

A procedure of the attributes generation in FIG. 4(a) is described. For example, attributes are considered to be keywords. Keywords generation may be performed as follows:

(1) Extract words with capital letter
(2) Ordering
(3) Calculate number of occurrence; n
(4) Remove word if n >Max or n< Min,
(5) Remove stop-words (e.g., The, A, And, There)

wherein Max denotes a predetermined value for maximum occurrence per keyword, and Min denotes a predetermined value for minimum occurrence per keyword. The process listed in (4) may often be effective to improve accuracy. There is no substantial limitation on the order of executing the above procedures, and the order of the above process may be determined considering system conditions in use, and programming facilities. This is one example of a keyword generation procedure, and there may be many other procedures which it is possible to use in the present invention.

After generating the keywords and converting the SGML format, the document matrix thus built is shown in FIG. 3. A sample pseudo code for creating the document vector/matrix by the binary models without using a weighting factor and/or function is as follows:

REM: No Weighting factor and/or function
If kwd (j) appears in doc (i)
Then M(i,j)=1
Otherwise M(i,j)=0

A similar procedure may be applied to the time stamps when the time stamps are simultaneously used.

The present invention may use a weighting factor and/or a weighting function with respect to both the keywords and the time stamps when the document matrix D is created. The weight factor and/or the weight function for the keyword $W_K$ may include the number of times of occurrence of the keywords in the document, a position of the keyword in the document, whether or not the keyword is capitalized, but is not limited thereto. A weighting factor and/or weighting function $W_T$ for the time stamp may also be applied to obtain the time/date stamp as well as the keyword according to the present invention.

3. Creation of the Covariance Matrix and the Dimension Reduction of Matrix V

Figure 5:
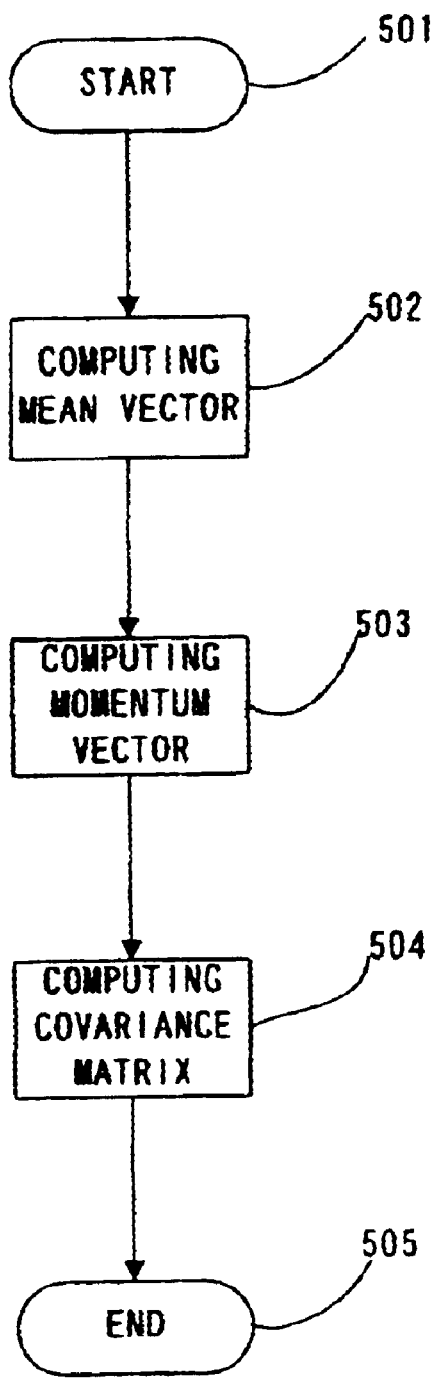
FIG. 5 is a flowchart for computing a covariance matrix.
Figure 6:
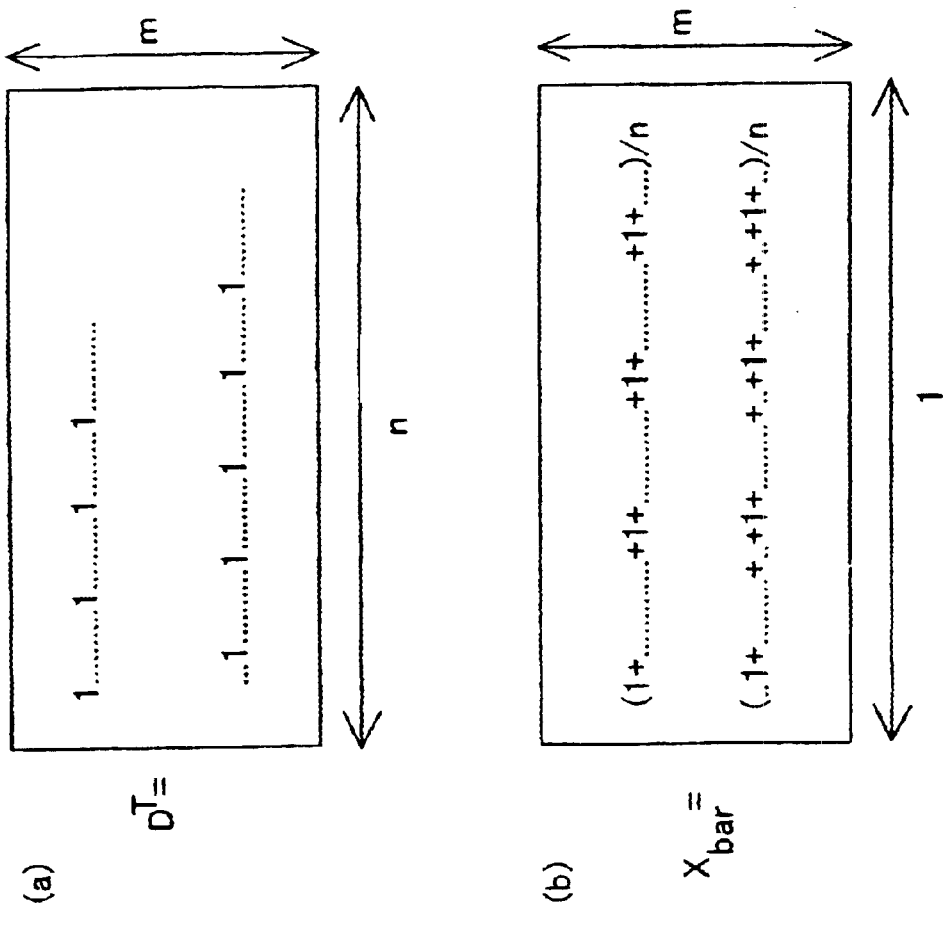
FIG. 6(a) and FIG. 6(b) illustrate schematic constructions of the transpose of the document matrix and a mean vector, respectively.

The creation of the covariance matrix comprises generally three steps as shown in FIG. 5, that is, step 502 for computing mean vectors $X_{bar}$, step 503 for computing the momentum matrix, and step 504 for computing the covariance matrix. FIGS. 6(a) and 6(b) show the details of the procedures described in FIG. 5. The mean vectors, $X_{bar}$, are computed by adding the elements in each of the rows of the transpose of the document matrix D as shown in FIG. 6(a) and dividing the sum of the elements by the document number, i.e., n. The construction of the mean vector $X_{bar}$, is shown in FIG. 6(b), where the transpose of the document matrix $D^T$ has n-by-m elements and $X_{bar}$ comprises only one column vector consisting of the mean values of the elements in the same row of $A^T$.

In step 503, the momentum matrix B is calculated by the following formula:

$$B = D^T \cdot D / n$$

wherein D denote the document matrix and the $D^T$ is the transpose thereof. Next the procedure proceeds to step 504 and computes the covariance matrix K which may be computed by the following formula using the mean vector $X_{bar}$ and the momentum matrix B:

$$K = B - X_{bar} \cdot X_{bar}^T$$

Figure 7:
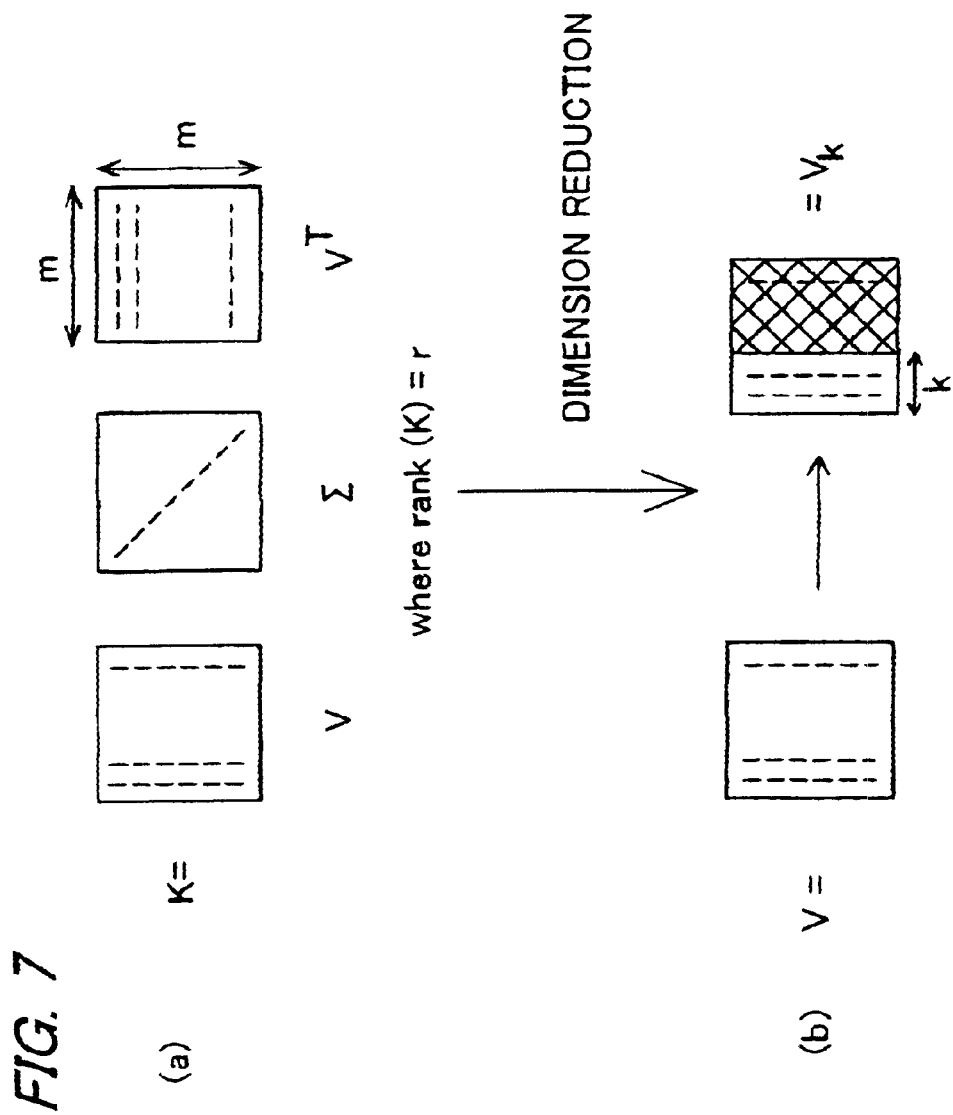
FIG. 7(a) and FIG. 7(b) illustrate a schematic procedure for dimension reduction using the covariance matrix.

The resulting covariance matrix K is a positive definite m-by-m structure. Thus, singular value decomposition thereof is straightforwardly computed by a conventional method. The structure of the covariance matrix K after the singular value decomposition is shown in FIG. 7(a) where the covariance matrix K is represented by the following formula:

$$K = V \cdot \Sigma \cdot V^T$$

where V is a matrix comprising eigenvectors, $\Sigma$ is a diagonal matrix, and $V^T$ is the transpose of the matrix V. In FIG. 7, the eigenvectors are represented by dashed lines.

The dimension reduction of the matrix V may be performed such that predetermined numbers k, as shown in FIG. 7(b), of the eigenvectors including the eigenvectors corresponding to the largest singular value, is selected to construct k-by-m matrix $V_k$. According to the present invention, the selection of the eigenvectors may be performed in various ways, as long as the eigenvector corresponding to the largest top singular value may be included. There is no substantial limitation on the numeric value k. However, the integer value k may preferably be set to about 15–25% of the total number of the eigenvectors so that retrieving and ranking of the documents in the database may be significantly improved. When the integer value k is too small, accuracy of the search may decrease, and when the integer value k is too large, the advantage of the present invention may be lost.

4. Dimension Reduction of the Document Matrix

Figure 8:
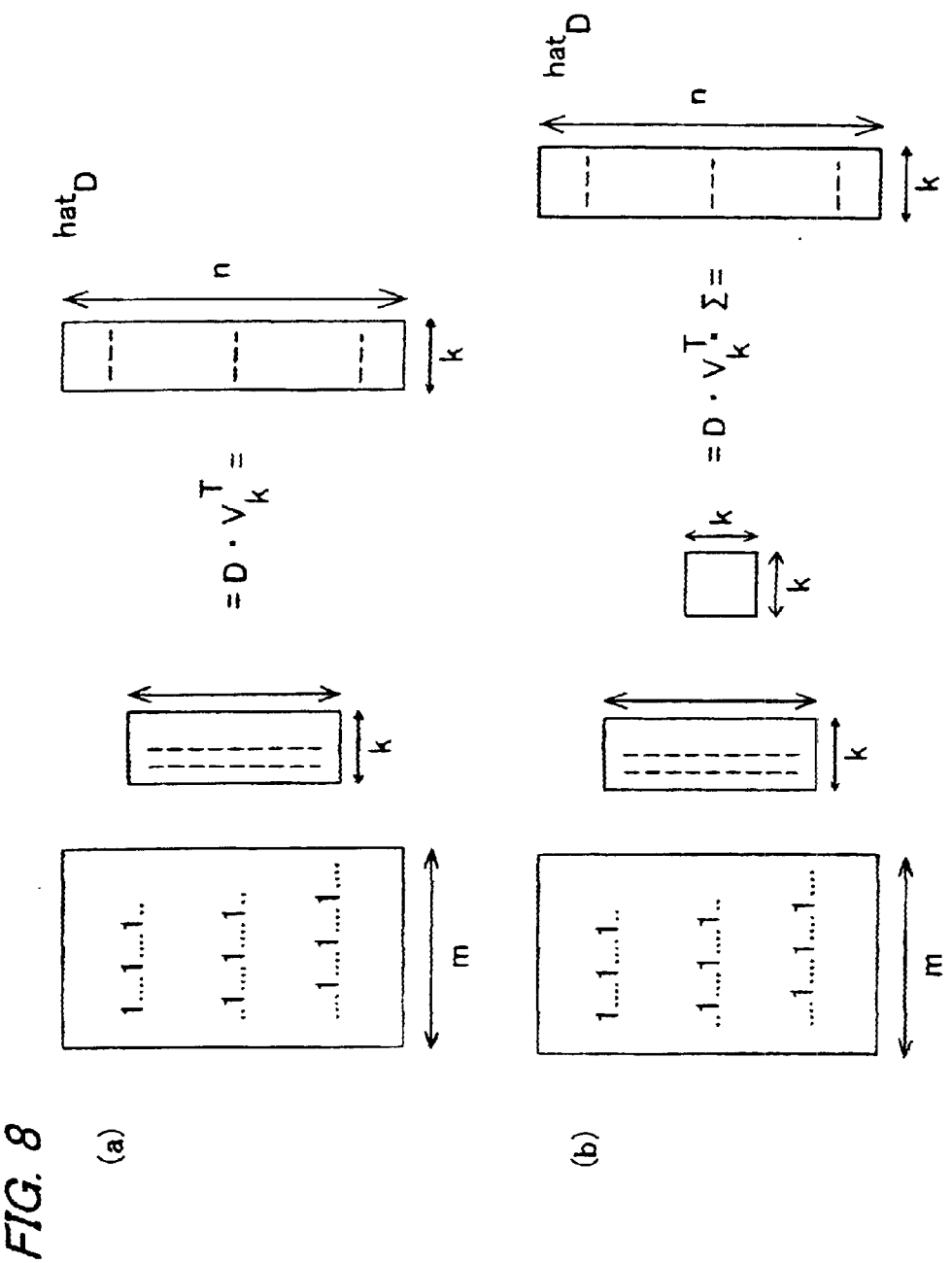
FIG. 8(a) and FIG. 8(b) illustrate a detailed procedure for dimension reduction using the covariance matrix according to the present invention.

Next the method according to the present invention executes dimension reduction of the document matrix using the matrix $V_k$. The dimension reduction of the document matrix is shown in FIG. 8(a) and FIG. 8(b). The dimension reduced matrix $^{hat}D$ of the document matrix $^{hat}D$, is simply computed by producing the document matrix D and the matrix $V_k$ as shown in FIG. 8(a). It may be possible to add some weighting to the dimension reduced matrix $^{hat}D$ using the weighting matrix with k-by-k elements as shown in FIG. 8(b). The computed matrix $^{hat}D$ has k-by-n elements, and comprises relatively significant features associated with the keywords. Therefore, the retrieving and ranking of the documents in the database may be significantly improved in response to the input query provided by a user of a search engine.

Figure 9:
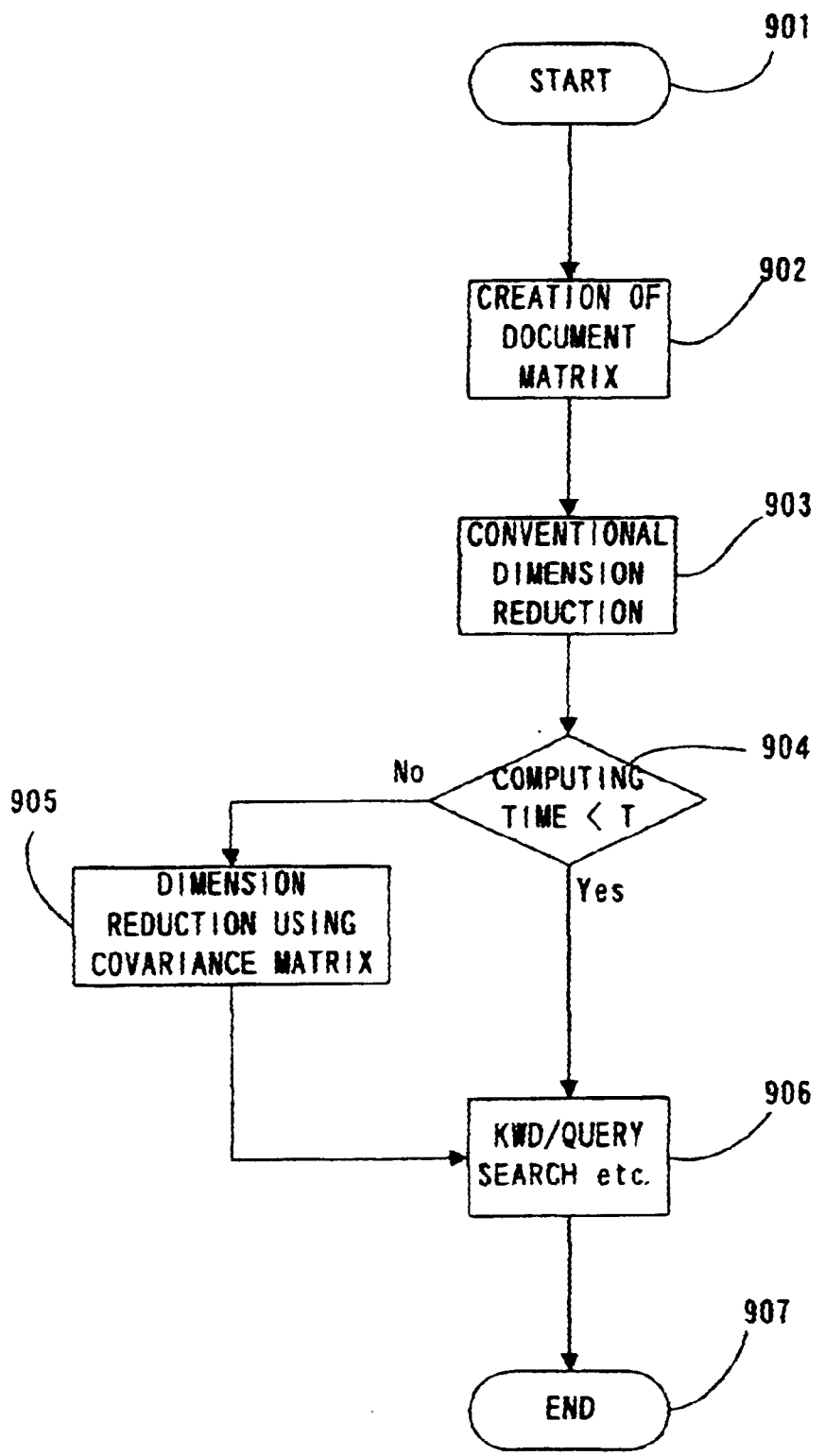
FIG. 9 is a flowchart of another embodiment of the method according the present invention.

FIG. 9 shows a flowchart of another embodiment for retrieving and ranking the documents in the very large database. The embodiment shown in FIG. 9 switches the dimension reduction method from a conventional method in which the document matrix D is subjected to the direct dimension reduction procedure which requires long computational time and huge hardware resources. In the embodiment described in FIG. 9, the step for determining computational time for the dimension reduction 904 is provided so as to determine whether or not the dimension reducing procedure according to the present invention is suitable for the documents in the subject database.

As shown in FIG. 9, the second embodiment of the present invention begins at step 901, and proceeds to step 902 to execute creation of the document matrix using the binary model. The procedure further proceeds to step 903 for executing a conventional dimension reduction using the document matrix directly. The second embodiment measures the computational time of the dimension reduction of the document matrix by suitable means such as a timer at step 904. If the computation time exceeds a predetermined time T (No), then the procedure diverts to step 905 for switching the method for dimension reduction to the method according to the present invention and the method proceeds to step 906 for executing KWD/query search etc. If, at step 904, the computation time does not exceed the predetermined time T, (Yes), the procedure proceeds to step 906 and then KWD/query search etc. may be executed so as to provide the search result.

5. Computer System

Figure 10:
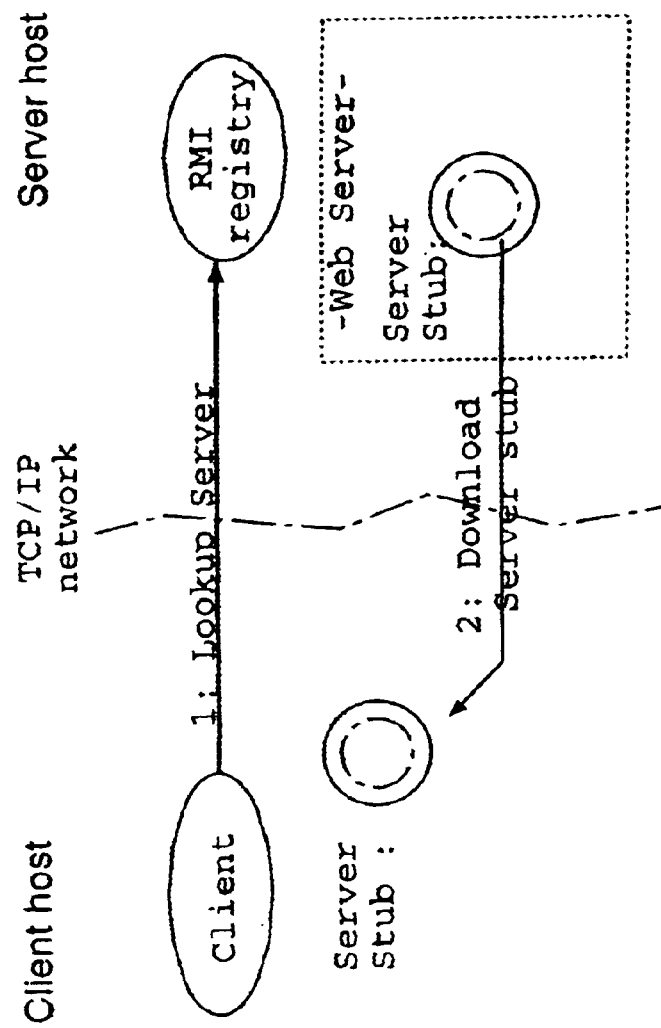
FIG. 10 shows a representative computer system according to the present invention.

Referring to FIG. 10, a representative embodiment of the computer system according to the present invention is described. The computer system according to the present invention may include a stand alone computer system, a client-server system communicating through a LAN/WAN with any conventional protocols, or a computer system including communication through an internet infrabase. In FIG. 10, the representative computer system effective in the present invention is described using client-server systems.

The computer system shown in FIG. 10 comprises at least one client computer and a server host computer. The client computer and the server host computer communicate through a TCP/IP communication protocol. However, any other communication protocols may be used in the present invention. As described in FIG. 10, the client computer issues a request 1 to the server host computer to carry out retrieving and ranking of the documents stored in memory means of the server host computer.

The server host computer executes retrieving and ranking of the documents in the database depending on the request from the client computer. A result of the detection and/or tracking is then downloaded by the client computer from the server host computer through the server stub so as to be used by a user of the client computer. In FIG. 10, the server host computer is described as the Web server, but is not limited thereto; server hosts of any other types may be used in the present invention so long as the computer systems provides the above described function.

Hereunder, the present invention will be further explained by non-limiting examples thereof.

EXAMPLES

The method according to the present invention was examined using the Reuters-21578 news database including over 20,000 articles available at: :http://www.research.att.com/~lewis. The documents in the database were retrieved by the method according to the present invention. A keyword list was generated by looking for words which contain an uppercase letter (capital letter) in any position in the keyword. Although the inventors used simple keyword models for the explained examples, there may be better models or keyword sets generated by other procedures. However, as described below, such simple models may provide sufficient results in retrieving and ranking the documents in the database. In keyword generation, words with too frequent or too infrequent appearances were eliminated from the keyword list to improve the accuracy.

The experiments were conducted with two different sets of retrieval and ranking using the method according to the present invention (examples) and the LSI (Latent Semantic Indexing) method for each query as comparable examples. The two different sets are as follows;

Set 1: A mini-database including 83 articles (documents) from the larger Reuters database was constructed to examine the method according to the present invention. The mini-database was small enough to know what the results to be retrieved by the input query should be.

Set 2: Full Reuters-21578 database was used to examine the method according to the present invention. The sample database including 83 documents is listed in table I.

TABLE I

| No | Date | Document title |
|---|---|---|
| 0 | 19870226 | iran announces end of major offensive in gulf |
| 1 | 19870226 | britain s alliance opposition wins by-election |
| 2 | 19870227 | britian conservatives ahead of labour in new polls |
| 3 | 19870227 | iran claims new victories near basra |
| 4 | 19870301 | strong earthquake hits new zealand |
| 5 | 19870301 | apple computer upgrades macintosh line |
| 6 | 19870302 | apple offer ms-dos products |
| 7 | 19870303 | earthquakes continue to shake northern new zealand |
| 8 | 19870303 | apple lt aapl expands network capabilities |
| 9 | 19870303 | airbus signs one billion dlr japanese contract |
| 10 | 19870304 | amr corp orders 40 jets from airbus and boeing |
| 11 | 19870304 | earthquakes continue in northern new zealand |
| 12 | 19870304 | iran reports offensive as iraq threatens air raids |
| 13 | 19870305 | iran reports heavy fighting in iraqi kurdistan |
| 14 | 19870300 | iraq says it crushes new iranian basra offensive |
| 15 | 19870307 | national opposition ahead in n z opinion poll |
| 16 | 19870309 | gencorp to sell los angeles television station to disney |
| 17 | 19870311 | iran claims 3 000 iraqi casualties in fighting |
| 18 | 19870312 | iraq says it crushed iranian attack in north |
| 19 | 19870313 | iraq says it crushed iranian attack in north |
| 20 | 19870314 | iraq says iran attack repulsed on southern front |
| 21 | 10670314 | new u k poll says tories have six-point lead |
| 22 | 19870315 | new u k poll says tories have six-point lead |
| 23 | 19870315 | thatcher party has nine point poll lead |
| 24 | 19870316 | thatcher party has nine point poll lead |
| 25 | 19870316 | zimmer lt zim boosts credit line by 4 3 min dlrs |
| 26 | 19870318 | japan earthquake kills one cuts phone lines |
| 27 | 19870318 | japan earthquake kills one cuts phone lines |
| 28 | 19870318 | iraq says it attacks two ships in gulf |
| 29 | 19870318 | iraq says it hit ship in gulf off iran today |
| 30 | 19870322 | swissair confirms order for six mcdonnell douglas md-11 |
| 31 | 19870319 | swissair orders six mcdonnell douglas md-11 jets |
| 32 | 19870322 | hussein says iran s year of decisiveness foiled |
| 33 | 19870323 | coca cola spokesman said rumors coke seeking takeover |
| 34 | 19870324 | coca cola says rumors incorrect |
| 35 | 19870324 | iraq reports attacks on supertanker oil targets |
| 36 | 19870323 | iraq reports attacks on supertanker oil targets |
| 37 | 19870324 | u s offers to escort kuwaiti tankers in gulf |
| 38 | 19870324 | att introduces new computer hardware software networking |
| 39 | 19870325 | att lt t introduces new computer products |
| 40 | 19870325 | mcdonnell douglas gets 30 6 mm dir contract |
| 41 | 19870325 | uk poll shows surge for centrist alliance parties |
| 42 | 19870326 | britain s centrist alliance gains in latest poll 10 days break |
| 43 | 19870405 | technology ibm s new computer nervously awaited |
| 44 | 19870405 | att lt t forms computer sales groups |
| 45 | 19870405 | grumman lt gq unit wins mcdonnell douglas order |
| 46 | 1987040 | ibm introduces four new personal computers compatible |
| 47 | 19870406 | ibm lt ibm introduces new personal computers |
| 48 | 19870406 | northwest airlines to buy up to 20 airbus a340 jets |
| 49 | 19870407 | northwest airlines orders long-range airbus jet |
| 50 | 19870407 | british opinion polls confirm thatcher lead |
| 51 | 19870408 | british opnion polls keep conservatives ahead |
| 52 | 19870408 | bahrain treasury bills yield average 6 00 pct |
| 53 | 19870408 | iraq says iran offensive on southern front checked |
| 54 | 19870408 | british opinion polls keep conservatives ahead |
| 55 | 19870409 | strong quake jolts central japan |
| 56 | 19870410 | british opinion polls keep conservatives ahead |
| 57 | 19870410 | iraq says iran offensive on southern front checked |
| 58 | 19870410 | thatcher flrm as pressure mounts for elections |
| 59 | 19870410 | bankers trust lt bt puts brazil on non-accrual |
| 60 | 19870411 | jal boeing crash caused by faulty repairs-report |
| 61 | 19870411 | iran says offensive aimed at destroying Iraq army |
| 62 | 19870411 | conservative lead drops in new u k opinion poll |
| 63 | 19870412 | iraqi troops reported pushing back iranians |

TABLE I-continued

| No | Date | Document title |
|---|---|---|
| 64 | 19870412 | airbus signs accord on cfm engine for a340 plane |
| 65 | 19870412 | iran says it opens new offensive north of baghdad |
| 66 | 19870413 | iran says it opens new offensive north of baghdad |
| 67 | 19870413 | israeli helicopters raid south lebanon radio |
| 68 | 19870414 | new gulf fighting not a major offensive ii s |
| 69 | 19870414 | guinness peat orders cfm engines for airbus a320 10 days break |
| 70 | 19870425 | latest british poll has thatcher still way ahead |
| 71 | 19870427 | new noll puts british conservatives well ahead |
| 72 | 19870601 | gull lt gll gets mcdonell douglas lt md contract |
| 73 | 19870601 | uk conservatives lead labour by seven points poll |
| 74 | 19870602 | mcdonnell douglas lt md gets big thai air order |
| 75 | 19870602 | japan report says faulty repairs caused jal crash 10 days break |
| 76 | 19870615 | technology alternatives to ibm software standard |
| 77 | 19870615 | chances of direct u s iran gulf clash seen low |
| 78 | 19871020 | ibm lt ibm adds to system 36 product line |
| 79 | 19871020 | coca cola enterprises inc lt cce 3rd qtr net |
| 80 | 19871025 | att lt t plans computer using sun lt stunw o chip |
| 81 | 19871025 | iran warns u s against raising tension in gulf |
| 82 | 19871025 | klm denies press report of air atlanta takeover |

Example 1 using SET 1

In Example 1, two methods, i.e., the method according to the present invention and the LSI method are compared. The data set on which the examination was performed was the small database constructed from the Reuter-21578 news database. The experiment was started from a 152 dimensional space, and the number of dimensions was reduced in both methods to a 30 dimensional space.

In the experiment, one given document included in the database was input as a query for retrieving and ranking. The input queries, used to retrieve the documents, therefore correspond to the first result (1) in each list of the tables. For each query, the result obtained by the LSI method is first presented as comparable examples followed by the result obtained by the method according to the present invention which uses a covariance matrix as examples. The sign "XXX" placed in front of a retrieved document indicates that the document is irrelevant to the input query. The results are listed as sets ordered as follows:

sign of error; order of document retrieved; relevancy; date of documents; document number; title of documents.

The results are shown in Table II-Table VI together with comments on the accuracy.

In the experiment using the second query, 2 documents were retrieved as errors in the method according to the present invention. However, the relevancy in the parenthesis showed significant cut off as described in Table III. Therefore, it is expected such errors may be eliminated by incorporating further refined keyword sets. In the experiment using the third query as described in Table IV documents 4, 7, and 11 were retrieved in the first rank. Documents 4, 7, and 11 are related to earthquakes which occurred in New Zealand. Although the method according to the present invention grouped together other documents without relation to the earthquake in New Zealand, the method according to the present invention may provide higher relative relevancy (shown in the parenthesis) together with the ranking thereof when compared with the LSI method. In the experiment described in Table VI, the gap between Macdonnel planes and other documents is well defined with high relevancy in the method according to the present invention, whereas the comparable examples shown in Table VI are interlaced with each other because of poor relevancy correlations.

Example 2 using SET 2

In Example 2, the same experimental procedure was used to retrieve and rank the documents except for the database. The database used in Example 2 was the entire set included in the Reuter-21578 news database. The 7100 keywords were selected from the words included in the document "19870304 1534 leaf disease hits sri lanka rubber". The results are shown from Table VII to Table X. The input query for each experiment was the first document listed in each of the corresponding Tables.

As shown in Table VII, the comparable example using the LSI method finds 1 document relevant to bahia cocoa, while the method according to the present invention retrieves 2 documents relating to bahia cocoa. The method according to the present invention further succeeded in finding another document related to cocoa.

TABLE II

FIRST QUERY: doc 0.

LSI OUTPUT:

| | | |
|---|---|---|
| 1 (1). | 19870226 0 | iran announces end of major offensive in gulf war |
| 2 (0.440556) | 19870412 63 | iraqi troops reported pushing back iranians |
| 3 (0.272448). | 19870227 3 | iran claims new victories near basra |
| 4 (0.207149). | 19870412 65 | iran says it opens new offensive north of baghdad |
| 5 (0.186654). | 19870324 37 | u s offers to escort kuwaiti tankers in gulf |
| 6 (0.177753). | 19870304 12 | iran reports offensive as iraq threatens air raids |
| XXX 7 (0.141545). | 19870601 72 | gull lt gil gets modonell douglas lt md contract |
| 8 (0.119549). | 19870411 61 | iran says offensive aimed at destroying iraq army |
| XXX 9 (0.1 19458). | 19870324 38 | att introduces new computer hardware software net working products |
| XXX 10 (0.119442). | 19870601 73 | uk conservatives lead labour by seven points poll |
| XXX 11 (0.105715). | 19870322 30 | swissair confirms order for six mcdonnell douglas m d-11 long-haul aircraft takes 12 options |
| XXX 12 (0.0905056). | 19070325 39 | att lt t introduces new computer products |
| 13 (0.089091). | 19870314 20 | iraq says iran attack repulsed on southern front |
| XXX 14 (0.0879247). | 19870227 2 | british conservatives ahead of labour in new polls |
| XXX 15 (0.0875587). | 19870615 76 | technology alternatives to ibm software standard |
| XXX 16 (0.0868745). | 19870226 1 | britain s alliance opposition wins by-election |
| XXX 17 (0.0748894). | 19870405 44 | att lt t forms computer sales groups |
| XXX 18 (0.0711138). | 19870602 75 | japan report says faufty repairs caused jal crash |
| 19 (0.0654004). | 19870413 66 | iran says it opens new offensive north of baghdad |
| XXX 20 (0.06373). | 19870414 69 | guinness peat orders cfm engines for airbus a320 |

Present Invention

| | | |
|---|---|---|
| 1 (1). | 19870226 0 | iran announces end of major offensive in gulf war |
| 2 (0.782098). | 19870412 63 | iraqi troops reported pushing back iranians |
| 3 (0.748328). | 19870412 65 | iran says it opens new offensive north of baghdad |
| 4 (0.712055). | 19870227 3 | iran claims new victories near basra |
| 5 (0.7022). | 19870413 86 | iran says it opens new offensive north of baghdad |
| 6 (0.872872). | 19870314 20 | iraq says iran attack repulsed on southern front |
| 7 (0.672008). | 19870304 12 | iran reports offensive as iraq threatens air raids |
| 8 (0.821231). | 19870313 19 | iraq says it crushed iranian attack in north |
| 9 (0.821231). | 19870312 18 | iraq says it crushed iranian attack in north |
| 10 (0.620396). | 19870322 32 | hussein says iran s year of decisiveness foiled |
| 11 (0.615705). | 19870414 68 | new gulf fighting not a major offensive u s |
| 12 (0.612225). | 19870410 57 | iraq says iran offensive on southern front checked |
| 13 (0.595027). | 19870411 61 | iran says offensive aimed at destroying iraq army |
| 14 (0.555632). | 19870408 53 | iraq says iran offensive on southern front checked |
| 15 (0.538684). | 19870308 14 | iraq says it crushes new iranian basra offensive |
| 16 (0.526716). | 19870305 13 | iran reports heavy fighting in iraqi kurdistan |
| 17 (0.513915). | 19870323 36 | iraq reports attacks on supertanker oil targets |
| 18 (0.471168). | 19870324 35 | iraq reports attacks on supertanker oil targets |
| 19 (0.460361). | 19870324 37 | u s offers to escort kuwaiti tankers in gulf |
| 20 (0.407308). | 19870311 17 | iran claims 3 000 iraqi casualties in fighting |

RESULT: 8/20 for LSI, 20/20 for COV

TABLE III

SECOND QUERY: doc 1

LSI OUTPUT

| | | |
|---|---|---|
| 1 (1). | 19870226 1 | britain s alliance opposition wins by-election |
| 2 (0.373425). | 19870314 21 | new u k poll says tories have six-point lead |
| 3 (0.373425). | 19870315 22 | new u k poll says tories have six-point lead |
| 4 (0.351552). | 19870316 24 | thatcher party has nine point poll lead |
| 5 (0.302828). | 19870601 73 | uk conservatives lead labour by seven points poll |
| XXX 6 (0.284157). | 19870405 45 | grumman lt gq unit wins mcdonnell douglas order |
| 7 (0.164825). | 19870326 42 | britain s centrist alliance gains in latest poll |
| XXX 8 (0.144872). | 19870412 63 | iraqi troops reported pushing back iranians |
| XXX 9 (0.13472). | 19870311 17 | iran claims 3 000 iraqi casualties in fighting |

TABLE III-continued

SECOND QUERY: doc 1

| | | |
|---|---|---|
| XXX 10 (0.114316). | 19870324 35 | iraq reports attacks on supertanker oil targets |
| XXX 11 (0.1128). | 19870305 13 | iran reports heavy fighting in iraqi kurdistan |
| 12 (0.0909611). | 19870410 58 | thatcher firm as pressure mounts for elections |
| 12 (0.0897704). | 19870315 23 | thatcher party has nine point poll lead |
| XXX 14 (0.0874094). | 19870303 8 | apple It aapi expands network capabilities |
| 15 (0.0868745). | 19870226 0 | iran announces end of major offensive in gulf war |
| XXX 16 (0.0796985). | 19870323 36 | iraq reports attacks on supertanker oil targets |
| XXX 17 (0.0768496). | 19870227 3 | iran claims new victories near basra |
| XXX 18 (0.0732204). | 19870411 60 | jal boeing crash caused by faulty repairs-report |
| XXX 19 (0.0619508). | 19870412 64 | airbus signs accord on cfm engine for a340 plane |
| 20 (0.0615333). | 19870425 70 | latest british poll has thatcher still way ahead |
| Present Invention | | |
| | | |
| 1 (1). | 19870226 1 | britain s alliance opposition wins by-election |
| 2 (0.852965). | 19870314 21 | new u k poll says tories have six-point lead |
| 3 (0.852965). | 19870315 22 | new u k poll says tories have six-point lead |
| 4 (0.815062). | 19870316 24 | thatcher party has nine point poll lead |
| 5 (0.780029). | 19870326 42 | britain a centrist alliance gains in latest poll |
| 6 (0.721886). | 19870315 23 | thatcher party has nine point poll lead |
| 7 (0.702324). | 19870601 73 | uk conservatives lead labour by seven points poll |
| 8 (0.640878). | 19870410 58 | thatcher firm as pressure mounts for elections |
| 9 (0.625387). | 19870425 70 | latest british poll has thatcher still way ahead |
| 10 (0.605047). | 19870325 41 | uk poll shows surge for centrist alliance parties |
| 11 (0.602333). | 19870227 2 | british conservatives ahead of labour in new polls |
| 12 (0.575694). | 19870427 71 | new poll puts british conservatives well ahead |
| 13 (0.530827). | 19870407 50 | british opinion polls confirm thatcher lead |
| 14 (0.434065). | 19870410 56 | british opinion polls keep conservatives ahead |
| 15 (0.434085). | 19870408 51 | british opnion polls keep conservatives ahead |
| 16 (0.434085). | 19870409 54 | british opnion polls keep conservatives ahead |
| 17 (0.362699). | 19870411 62 | conservative lead drops in new u k opinion poll |
| 18 (0.32423). | 19870307 15 | national opposition ahead in n z opinion poll |
| XXX 19 (0.106735). | 19870405 45 | grumman lt gq unit wins mcdonnell douglas order |
| XXX 20 (0.0878328). | 19870412 63 | iraqi troops reported pushing back iranians |

RESULT: 10/20 for LSI, 18/20 for present invention.

TABLE IV

THIRD QUERY: doc 4.

LSI OUTPUT

| | | |
|---|---|---|
| 1 (1). | IDZZZ 19870301 4 TIZZZ | strong earthquake hits new zealand |
| 2 (0.963353). | IDZZZ 19870304 11 TIZZZ | earthquakes continue in northern new zealand |
| 3 (0.958744). | IDZZZ 19870303 7 TIZZZ | earthquakes continue to shake northern new zealand |
| 4 (0.4337). | IDZZZ 19870409 55 TIZZZ | strong quake jolts central japan |
| XXX 5 (0.240364). | IDZZZ 19870412 85 TIZZZ | iran says it opens new offensive north of baghdad |
| XXX 6 (0.185248). | IDZZZ 19870413 66 TIZZZ | iran says it opens new offensive north of baghdad |
| XXX 7 (0.155252). | IDZZZ 19870307 15 TIZZZ | national opposition ahead in n z opinion poll |
| 8 (0.12405). | IDZZZ 19870318 26 TIZZZ | japan earthquake kills one cuts phone lines |
| 9 (0.12405). | IDZZZ 19870318 27 TIZZZ | japan earthquake kills one cuts phone tines |
| XXX 10 (0.108274). | IDZZZ 19870306 14 TIZZZ | iraq says it crushes new Iranian basra offensive |
| Present Invention | | |
| | | |
| 1 (1). | IDZZZ 19870301 4 TIZZZ | strong earthquake hits new zealand |
| 2 (0.980294). | IDZZZ 19870304 11 TIZZZ | earthquakes continue in northern new zealand |
| 3 (0.974638). | IDZZZ 19870303 7 TIZZZ | earthquakes continue to shake northern new zealand |
| 4 (0.699763). | IDZZZ 19870409 55 TIZZZ | strong quake jolts central japan |
| 5 (0.509114). | IDZZZ 19870318 26 TIZZZ | japan earthquake kills one cuts phone lines |
| 6 (0.509114). | IDZZZ 19870318 27 TIZZZ | japan earthquake kills one outs phone lines |
| XXX 7 (0.243546). | IDZZZ 19870324 37 TIZZZ | u s offers to escort kuwaiti tankers in gulf |
| XXX 8 (0.216852). | IDZZZ 19870305 13 TIZZZ | iran reports heavy fighting in iraqi kurdistan |
| XXX 9 (0.14562). | IDZZZ 19870324 34 TIZZZ | coca cola says rumors incorrect |
| XXX 10 (0.131449). | IDZZZ 19870412 65 TIZZZ | iran says it opens new offensive north of baghdad |

RESULT: 6/10 for LSI, 6/10 for present invention.

TABLE V

FOURTH QUERY: doc 5.

LSI OUTPUT

| | | |
|---|---|---|
| 1 (1). | 19870301 5 | apple computer upgrades macintosh line |
| 2 (0.529258). | 19870405 43 | technology ibm a new computer nervously awaited |
| 3 (0.287135). | 19870303 8 | apple lt aapl expands network capabilities |
| XXX 4 (0.244276). | 19870309 16 | gencorp to sell los angeles television station to walt disney co |
| XXX 5 (0.138885). | 19870802 75 | japan report says faulty repairs caused jal crash |
| 6 (0.0691742). | 19871020 78 | ibm lt ibm adds to system 36 product line |
| XXX 7(0.0683454). | 19870410 58 | thatcher firm as pressure mounts for elections |
| XXX 8 (0.0649077). | 19870615 77 | chances of direct us iran gulf clash seen low |
| XXX 9 (0.0600461). | 19870226 0 | iran announces end of major offensive in gulf war |
| XXX 10 (0.0595292). | 19870427 71 | new poll puts british conservatives well ahead |
| 11(0.0529651). | 19871025 80 | att ltt plans computer using sun lt sunw o chip |
| XXX 12 (0.050805). | 19870413 66 | iran says it opens new offensive north of baghdad |
| XXX 13 (0.0498997). | 19870322 30 | swissair confirms order for six mcdonnell douglas md 11 long-haul aircraft takes 12 options |

Present Invention

| | | |
|---|---|---|
| 1 (1). | 19870301 5 | apple computer upgrades macintosh line |
| 2 (0.823541). | 19870405 43 | technology ibm a new computer nervously awaited |
| 3 (0.681). | 19871020 78 | ibm lt ibm adds to system 36 product line |
| 4 (0.623508). | 19870303 8 | apple lt aspl expands network capabilities |
| 5 (0.577994). | 19870302 6 | apple offer ms-dos products |
| 6 (0.568274). | 19870615 76 | technology alternatives to ibm software standard |
| 7 (0.537104). | 19870405 44 | att lt t forms computer sales groups |
| 8 (0.485649). | 19871025 80 | att lt t plans computer using sun it sunw o chip |
| 9 (0.446352). | 19870406 47 | ibm lt ibm introduces new personal computers |
| 10 (0.418928). | 19870405 46 | ibm introduces four new personal computers compatible with existing pc s |
| 11 (0.260893). | 19870325 39 | att lt t introduces new computer products |
| XXX 12 (0.253964). | 19870309 16 | gencorp to sell los angeles television station to walt disney co |
| 13 (0.195269). | 19870324 38 | att introduces new computer hardware software networking products |

RESULT: 5/13 for LSI, 12/13 for present invention.

TABLE VI

FIFTH QUERY: doc 30.

LSI OUTPUT

| | | |
|---|---|---|
| 1 (1). | 19870322 30 | swissair confirms order for six mcdonnell douglas md-11 long-haul aircraft takes 12 options |
| 2 (0.711993). | 19870319 31 | swissair orders six mcdonnell douglas md-11 jets |
| 3 (0.676327). | 19870602 74 | mcdonnell douglas lt md gets big thai air order |
| 4 (0.278837). | 19870601 72 | gull lt gll gets mcdonell douglas lt md contract |
| 5 (0.180408). | 19870414 69 | guinness peat orders cfm engines for airbus a320 |
| 6 (0.121236). | 19870405 45 | grumman ft gq unit wins mcdonnell douglas order |
| XXX 7 (0.105715). | 19870226 0 | iran announces end of major offensive in gulf war |
| XXX 8 (0.0979304). | 19870405 44 | att lt t forms computer sales groups |
| XXX 9 (0.0821758). | 19870318 29 | iraq says it hit ship in gulf off iran today |
| XXX 10 (0.0818634). | 19870306 14 | iraq says it crushes new iranian basra offensive |
| XXX 11 (0.064851). | 19870405 43 | technology ibm s new computer nervously awaited |
| 12 (0.0571068). | 19870407 49 | northwest airlines orders long-range airbus jet |
| 13 (0.05478). | 19870325 40 | mcdonnell douglas gets 30 6 mln dlr contract |
| 14 (0.0548145). | 19870602 75 | japan report says faulty repairs caused jal crash |
| XXX 15 (0.0498997). | 19870301 5 | apple computer upgrades macintosh line |

Present Invention

| | | |
|---|---|---|
| 1 (1). | 19870322 30 | swissair confirms order for six mcdonnell douglas md-11 long-haul aircraft takes 12 options |
| 2 (0.843439). | 19870602 74 | mcdonnell douglas it md gets big thai air order |
| 3 (0.812592). | 19870319 31 | swissair orders six mcdonnell douglas md-11 jets |
| 4 (0.746001). | 19870601 72 | gull It gll gets mcdonell douglas lt md contract |
| 5 (0.580939). | 19870405 45 | grumman lt gq unit wins mcdonnell douglas order |
| 6 (0.526924). | 19870407 49 | northwest airlines orders long-range airbus jet |
| 7 (0.491698). | 19870325 40 | mcdonnell douglas gets 30 6 mm dlr contract |
| 8 (0.325935). | 19870414 69 | guinness peat orders cfm engines for airbus a320 |
| 9 (0.126929). | 19870411 60 | jal boeing crash caused by faulty repairs-report |
| 10 (0.123315). | 19870412 64 | airbus signs accord on din engine for a340 plane |
| 11(0.118561). | 19870602 75 | japan report says faulty repairs caused jul crash |
| XXX 12 (0.11798). | 19870324 37 | u s offers to escort kuwaiti tankers in gulf |
| XXX 13 (0.105748). | 1987022 60 | iran announces end of major offensive in gulf war |
| 14 (0.0779336). | 19870303 9 | airbus signs one billion dlr japanese contract |
| 15 (0.056676). | 19870304 10 | amr corp orders 40 jets from airbus and boeing |

RESULT: 9/15 or 6/11 for LSI, 13/15 or 11/11 for present invention.

TABLE VII

FIRST QUERY: doc 0

LSI OUTPUT

| | | |
|---|---|---|
| 1 (1). | 19870226 0 | bahia cocoa review |
| 2 (0.456161). | 19870312 4469 | pessimism mounts over bahian temporao cocoa crop |
| XXX 3 (0.454656). | 19870313 5032 | cbt traders say u s conservation signup neutral |
| XXX 4(0.454018). | 19870317 6033 | k mart it km ends talks to sell stores |
| 5 (0.441 66). | 19870403 12970 | ec wheat release unlikely to satisfy u k demand |
| 6 (0.394049). | 19870409 15952 | u s weekly soybean crush 19 416 000 bushels |
| 7 (0.38171). | 19870402 12427 | u k grain experts continue to rise sharply |
| 8 (0.378776). | 19870226 68 | u s weekly soybean crush 21 782 929 bushels |
| XXX 9 (0.378115). | 19870313 4896 | ussr livestock may be in good shape-u s report |
| 10 (0.377868). | 19870312 4056 | awb says australian wheat sales over 10 mln tonnes |

Present Invention

| | | |
|---|---|---|
| 1 (1). | 19870226 0 | bahia cocoa review |
| 2 (0.70893). | 19870312 4469 | pessimism mounts over bahian temporao cocoa crop |
| 3 (0.672383). | 19870403 12970 | ec wheat release unlikely to satisfy u k demand |
| 4 (0.659527). | 19871019 21556 | rubber stock manager says quality acceptable |
| 5 (0.650102). | 19870304 1534 | leaf disease hits sri lanka rubber |
| 6 (0.64226). | 19870316 5213 | european beet plantings seen little changed |
| 7 (0.635392). | 19870407 14342 | london cocoa closes narrowly mixed |
| 8 (0.633865). | 19870602 18023 | italian barley crop reported in good condition |
| XXX 9 (0.625462). | 19870309 3134 | little movement on hamburg fishmeal market |
| 10 (0.624226). | 19870331 11458 | traders cut bahia temporao cocoa crop estimate |

TABLE VIII

SECOND QUERY: doc 233

LSI OUTPUT

| | | |
|---|---|---|
| 1 (1). | 19870301 233 | british conservatives ahead of labour in new polls |
| 2 (0.573629). | 19870407 13416 | british opinion polls keep conservatives ahead |
| 3 (0.573629). | 19870407 13533 | british opinion polls keep conservatives ahead |
| 4 (0.573629). | 19870407 13626 | british opinion polls keep conservatives ahead |
| 5 (0.548998). | 19870601 17460 | tories maintain lead 10 days before u k election |
| 6 (0.523732). | 19870602 17892 | uk conservatives lead labour by seven points poll |
| 7 (0.503102). | 19870403 12743 | thatcher prospects boosted by ussr trip poll says |
| 8 (0.490248). | 19870427 17280 | new poll puts british conservatives well ahead |
| 9 (0.480592). | 19870405 13259 | british opinion polls confirm thatcher lead |
| 10 (0.478225). | 19870315 5160 | thatcher party has nine point poll lead |
| XXX 11 (0.467018). | 19870302 835 | leucadia lt luk has 7 2 pct of minstar lt mnst |
| XXX 12 (0.464678). | 19870629 19524 | thai minister says prem may dissolve parliament |
| 13 (0.461705). | 19870316 5324 | thatcher party has nine point poll lead |
| XXX 14 (0.432831). | 19870323 8404 | iraqi oil minister replaced official |
| XXX 15 (0.421924). | 19870313 4704 | nakasone refuses to drop sales tax |
| XXX 16 (0.421924). | 19870313 4669 | nakasone refuses to drop sales tax |
| 17 (0.421251). | 19870305 2555 | national opposition ahead in n z opinion poll |
| XXX 18 (0.419808). | 19870629 19728 | epa denies wheeling-pittsburgh it qwhx request |
| XXX 19 (0.413706). | 19870403 12945 | chicago pacific lt cpac upgraded by moody s |
| 20 (0.406188). | 19870408 15227 | conservative lead drops in new u k opinion poll |

Present Invention

| | | |
|---|---|---|
| 1 (1). | 19870301 233 | british conservatives ahead of labour in new polls |
| 2 (0.618049). | 19870601 17460 | tories maintain lead 10 days before u k election |
| 3 (0.608515). | 19870405 13259 | british opinion polls confirm thatcher lead |
| 4 (0.597552). | 19870403 12743 | thatcher prospects boosted by ussr trip poll says |
| 5 (0.595458). | 19870407 13416 | british opnion polls keep conservatives ahead |
| 6 (0.595458). | 19870407 13626 | british opinion polls keep conservatives ahead |
| 7 (0.595458). | 19870407 13533 | british opinion polls keep conservatives ahead |
| 8 (0.588147). | 19870602 17892 | uk conservatives lead labour by seven points poll |
| XXX 9 (0.575424). | 19870629 19524 | thai minister says prem may dissolve parliament |
| 10 (0.563454). | 19870315 5160 | thatcher party has nine point poll lead |
| XXX 11(0.548059). | 19870316 5773 | conservatives make major gains in finnish polls |
| 12 (0.546054). | 19870407 14029 | thatcher firm as pressure mounts for elections |
| XXX 13 (0.532109). | 19870618 18564 | dutch parliament backs stand against oils tax |
| 14 (0.529204). | 19870427 17280 | new poll puts british conservatives well ahead |
| XXX 15 (0.527023). | 19870302 835 | leucadia lt luk has 7 2 pct of minstar lt mnst |
| XXX 16 (0.526272). | 19870311 3501 | nakasone set to stay until tax reform approved |
| XXX 17 (0.526272). | 19870311 3669 | nakasone set to stay until tax reform approved |
| 18 (0.517917). | 19870316 5324 | thatcher party has nine point poll lead |
| XXX 19 (0.517578). | 19870323 8138 | nakasone defends sales tax as campaigning begins |
| XXX 20 (0.517578). | 19870323 8306 | nakasone defends sales tax as campaigning begins |

RESULT: 13/20 for LSI, 12/20 for present invention.

TABLE IX

THIRD QUERY: doc 8791

LSI OUTPUT

| | | |
|---|---|---|
| 1 (1). | 19870324 8791 | att lt t introduces new computer products |
| 2 (0.688909). | 19870324 8765 | digital equipment it dec announces products |
| 3 (0.618605). | 19870330 11053 | 3com corp it corns introduces new workstation |
| 4 (0.60844). | 19870324 8789 | att introduces new computer hardware software networking products |
| 5 (0.584184). | 19870302 668 | apple lt aapl ast lt asta offer ms-dos products |
| 6 (0.578772). | 19871019 21303 | wang lt wan announces four computers |
| 7 (0.575746). | 19870407 13864 | motorola lt mot unveils new computers |
| 8 (0.570749). | 19870403 12870 | nynex lt nyn to sell new ibm lt ibm computers |
| 9 (0.565076). | 19871020 20198 | ibm lt ibm adds to system 36 product inc |
| 10 (0.552604). | 19870421 17025 | att lt t launches systems for small businesses |
| 11 (0.551226). | 19870629 19773 | sunriver introduces new workstations |
| 12 (0.549977). | 19870401 12233 | att to sell neti technologies software |
| 13 (0.547357). | 19870408 15159 | advanced micro lt amd unveils computer chips |
| 14 (0.532711). | 19870618 18711 | france videotex service in pact with u s unit |

Present Invention

| | | |
|---|---|---|
| 1 (1). | 19870324 8791 | att lt t introduces new computer products |
| 2 (0.836757). | 19870324 8765 | digital equipment lt dec announces products |
| 3 (0.760777). | 19870407 13864 | motorola lt mot unveils new computers |
| 4 (0.760238). | 19870330 11053 | 3com corp lt coms introduces new workstation |
| 5 (0.745675). | 19870408 15159 | advanced micro lt amd unveils computer chips |
| 6 (0.722415). | 19871019 21303 | wang lt wan announces four computers |
| 7 (0.711155). | 19870407 13706 | wang lt wan b adds entry-level tempest units |
| 8 (0.702783). | 19870319 7163 | gandalf lt gandf introduces new products |
| XXX 9 (0.701353). | 19870309 3178 | british airways lt bab offering holiday package |
| 10 (0.684171). | 19871020 20198 | ibm lt ibm adds to system 36 product line |
| 11 (0.682255). | 19870629 19773 | sunriver introduces new-workstations. |
| 12 (0.880615). | 19870302 688 | apple lt aapl ast lt asta offer ms-dos products |
| 13 (0.679031). | 19870421 17025 | att lt t launches systems for small businesses |
| 14 (0.6741 93). | 19870324 8988 | att lt t launches new software packages |

TABLE X

LSI OUTPUT:

| | | |
|---|---|---|
| 1 (1). | 19870408 15229 | iraqi troops reported pushing back iranians |
| XXX 2 (0.520211). | 19870328 10629 | greece scraps u s base closure request |
| XXX 3 (0.520211). | 19870330 10796 | greece scraps u s base closure request |
| 4 (0.491585). | 19870323 8515 | iraq reports attacks on supertanker oil targets |
| 5 (0.483682). | 19870318 6403 | iraq says it attacks two ships in gulf |
| XXX 6 (0.479128). | 19870316 5223 | south china storms kill two damage crops |
| 7 (0.475971). | 19870407 13665 | iraq says iran offensive on southern front checked |
| 8 (0.455307). | 19870407 13526 | iraq says iran offensive on southern front checked |
| 9 (0.455069). | 19870305 1983 | no mines damage reported after chile tremor |

OUR METHOD:

| | | |
|---|---|---|
| 1 (1). | 19870408 15229 | iraqi troops reported pushing back iranians |
| 2 (0.656907). | 19870323 8515 | iraq reports attacks on supertanker oil targets |
| XXX 3 (0.647154). | 19870305 1983 | no mines damage reported after chile tremor |
| 4 (0.636072). | 19870407 13526 | iraq says iran offensive on southern front checked |
| 5 (0.632777). | 19870407 13665 | iraq says iran offensive on southern front checked |
| 6 (0.628688). | 19870323 8439 | iraq reports attacks on supertanker oil targets |
| 7 (0.624801). | 19870318 6403 | iraq says lt attacks two ships in gulf |
| 8 (0.617937). | 19870305 1937 | iran reports heavy fighting in iraqi kurdistan |
| 9 (0.614175). | 19870305 2033 | iraq says lt crushes new iranian basra offensive |

RESULT: 6/9 for LSI, 8/9 for present invention.

As shown in Table II–Table X, the method according to the present invention exhibited better results for retrieving and ranking the documents than the results obtained by the LSI method, while some errors were observed. Thus, the present invention may provide novel and effective detection and tracking of the database. The method according to the present invention is also stable against the addition of new documents to the database, because the covariance matrix is used to reduce the dimension of the document matrix and only 15–20% of the largest i-th eigenvectors, which are not significantly sensitive to the addition of new documents to the database, are used. Therefore, once the covariance matrix is formed, many searches may be performed without elaborate and time consuming computation for singular value decomposition each time that search is performed, as long as the accuracy of the search is maintained, thereby significantly improving performance.

As described above, the present invention has been disclosed with respect to the specific embodiments thereof. However, a person skilled in the art may appreciate that various omissions, modifications, and other embodiments are possible within the scope of the present invention.

The present invention has been explained in detail with respect to the method for retrieving and ranking as well as detection and tracking. However, the present invention also contemplates a system for executing the method described herein, the method itself, and a program product within which the program for executing the method according to the present invention may be stored such as for example, optical, magnetic, or electro-magnetic media, used in the computer system of FIG. 10. The true scope can be determined only by the claims appended.

What is claimed is:

1. A method for retrieving and/or ranking documents in a database, the documents including attribute data, said method comprising steps of:

provide a document matrix from said documents, said matrix including numerical elements derived from said attribute data;

providing a covariance matrix from said document matrix;

executing singular value decomposition of said covariance matrix so as to obtain the following formula:

$$K = V \cdot \Sigma \cdot V^T,$$

wherein K represents said covariance matrix, V represents the matrix consisting of eigenvectors, $\Sigma$ represents a diagonal matrix, and $V^T$ represents a transpose of the matrix V;

reducing a dimension of said matrix V using predetermined numbers of eigenvectors included in said matrix V, said eigenvectors including an eigenvector corresponding to the largest singular value;

reducing a dimension of said document matrix using said dimension reduced matrix V; and retrieving and/or ranking said documents in said database by computing a scalar product between said dimension reduced document matrix and a query vector, wherein said covariance matrix is computed by the following formula:

$$K = B - X_{bar} \cdot X_{bar}^T,$$

wherein K represents said covariance matrix, B represents a momentum matrix, $X_{bar}$ represents a mean vector and $X_{bar}^T$ represents a transpose of said mean vector.

2. The method according to claim 1, wherein said attributes include at least one keyword and/or a time stamp.

3. The method according to claim 1, wherein said predetermined numbers are 15–25% of a total or the eigenvectors of said covariance matrix.

4. The method according to claim 1, further comprising switching from dimension reduction using said document matrix directly to dimension reduction using said covariance matrix depending on a predetermined computation time, so that said dimension reduction, using said covariance matrix, is executed when said dimension reduction of said document matrix using eigenvectors thereof computed from said document matrix is not completed within said predetermined computation time.

5. The method according to claim 1, further comprising adding documents to said database.

6. A computer system for executing a method for retrieving and/or ranking documents in a database, the documents including attribute data, said computer system having apparatus for:

providing a document matrix from said documents, said matrix including numerical elements derived from said attribute data;

providing a covariance matrix from said document matrix;

executing singular value decomposition of said covariance matrix so as to obtain the following formula:

$$K = V \cdot \Sigma \cdot V^T,$$

wherein K represents said covariance matrix, V represents the matrix consisting of eigenvectors, $\Sigma$ represents a diagonal matrix, and $V^T$ represents a transpose of the matrix V;

reducing a dimension of said matrix V using predetermined numbers of eigenvectors included in said matrix V, said eigenvectors including an eigenvector corresponding to the largest singular value;

reducing a dimension of said document matrix using said dimension reduced matrix V; and retrieving and/or ranking said documents in said database by computing a scalar product between said dimension reduced document matrix and a query vector, wherein said covariance matrix is computed by the following formula:

$$K = B - X_{bar} \cdot X_{bar}^T,$$

wherein K represents said covariance matrix, B represents a momentum matrix, $X_{bar}$ represents a mean vector and $X_{bar}^T$ represents a transpose of said mean vector.

7. The computer system according to the claim 6, wherein said attributes include at least one keyword and/or a time stamp.

8. The computer system according to claim 6, wherein said predetermined numbers are 15–25% of a total of the eigenvectors of said covariance matrix.

9. The computer system according to claim 6, further comprising apparatus for switching from dimension reduction using said document matrix directly to dimension reduction using said covariance matrix, depending on a predetermined computation time, so that saw dimension reduction, using said covariance matrix, is executed when said dimension reduction of said document matrix, using eigenvectors thereof computed from said document matrix, is not completed within said predetermined computation time.

10. The computer according to claim 6, further comprising apparatus for adding documents to said database.

11. A program product including a computer readable computer program for executing a method for retrieving and/or ranking documents in a database, the documents including attribute data, said computer program including computer readable code for causing said apparatus to execute the steps of:

providing a document matrix from said documents, said matrix including numerical elements derived from said attribute data;

providing a covariance matrix from said document matrix;

executing singular value decomposition of said covariance matrix so as to obtain the following formula:

$$K = V \cdot \Sigma \cdot V^T,$$

wherein K represents said covariance matrix, V represents the matrix consisting of eigenvectors, $\Sigma$ represents a diagonal matrix, and $V^T$ represents a transpose of the matrix V;

reducing a dimension of said matrix V using predetermined numbers of eigenvectors included in said matrix V, said eigenvectors including an eigenvector corresponding to the largest singular value;

reducing a dimension of said document matrix using said dimension reduced matrix V; and retrieving and/or ranking said documents in said database by computing a scalar product between said dimension reduced document matrix and a query vector, wherein said covariance matrix is computed by the following formula:

$$K = B - X_{bar} \cdot X_{bar}^T$$

wherein K represents said covariance matrix, B represents a momentum matrix, $X_{bar}$ represents a mean vector and $X_{bar}^T$ represents a transpose of said mean vector.

12. The program product according to the claim 11, wherein said attributes include at least one keyword and/or a time stamp.

13. The program product according to claim 11, wherein said predetermined numbers are 15–25% of a total of the eigenvectors of said covariance matrix.

14. The program product according to claim 11, wherein said steps further comprise a switching step from dimension reduction using said document matrix directly to dimension reduction using said covariance matrix depending on a predetermined computation time, so that said dimension reduction, using said covariance matrix, is executed when said dimension reduction of said document matrix using eigenvectors thereof, computed from said document matrix, is not completed within said predetermined computation time.

15. The program product according to claim 11, further comprising computer code for accepting additional documents for addition to said database.

* * * * *